United States Patent
Ting et al.

(10) Patent No.: US 10,474,893 B2
(45) Date of Patent: Nov. 12, 2019

(54) ELECTRONIC DEVICE, IRIS RECOGNITION METHOD AND COMPUTER-READABLE MEDIUM

(71) Applicant: Industrial Technology Research Institute, Hsinchu (TW)

(72) Inventors: Wen-Hung Ting, Tainan (TW); Hian-Kun Tenn, Tainan (TW); Duan-Li Liao, Taichung (TW); Chia-Chang Li, Pingtung County (TW); Po-Lung Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 73 days.

(21) Appl. No.: 15/960,559

(22) Filed: Apr. 24, 2018

(65) Prior Publication Data

US 2019/0303645 A1    Oct. 3, 2019

(30) Foreign Application Priority Data

Apr. 3, 2018  (TW) .............................. 107111922 A

(51) Int. Cl.
*G06K 9/00* (2006.01)

(52) U.S. Cl.
CPC ....... *G06K 9/0061* (2013.01); *G06K 9/00604* (2013.01); *G06K 9/00617* (2013.01)

(58) Field of Classification Search
CPC ............. G06K 9/00597; G06K 9/0061; G06K 9/00617; G06K 9/00604; G06F 21/32; G06T 2207/30041
See application file for complete search history.

(56) References Cited

U.S. PATENT DOCUMENTS 6,606,397 B1 * 8/2003 Yamamoto ............. A61B 3/113 340/575
6,614,919 B1    9/2003 Suzaki et al.
(Continued)

FOREIGN PATENT DOCUMENTS

| CN | 104484649 | 4/2015 |
| CN | 107346419 | 11/2017 |
| CN | 107430437 | 12/2017 |
| TW | I427544 | 2/2014 |

(Continued)

OTHER PUBLICATIONS

"Notice of Allowance of Taiwan Counterpart Application," dated Mar. 8, 2019, p. 1-p. 4.

(Continued)

*Primary Examiner* — Carol Wang
(74) *Attorney, Agent, or Firm* — JCIPRNET

(57) ABSTRACT

An electronic device, an iris recognition method and a non-volatile computer-readable medium are provided. A processor in the electronic device obtains a first and second iris images, and calculates a plurality of first and second feature mark boxes that are non-uniformly arranged according to the first and second iris images. The processor uses the first feature mark boxes to obtain a first and second image features from the first and second iris images respectively, and compares the first and second image features to obtain a first recognition result. The processor uses the second feature mark boxes to obtain a third and fourth image features from the second and first iris images respectively, and compares the third and fourth image features to obtain a second recognition result. The processor determines a similarity degree of the first and second iris images according to the first and second recognition results.

13 Claims, 5 Drawing Sheets

(56) References Cited

U.S. PATENT DOCUMENTS

| | | | |
|---|---|---|---|
| 7,436,986 B2 | 10/2008 | Caldwell | |
| 9,235,782 B1* | 1/2016 | Zomet | G06K 9/00281 |
| 2005/0078869 A1 | 4/2005 | Kim | |
| 2006/0126940 A1* | 6/2006 | Kim | G06K 9/00597 |
| | | | 382/190 |
| 2007/0172099 A1 | 7/2007 | Park et al. | |
| 2010/0014755 A1* | 1/2010 | Wilson | G06K 9/00604 |
| | | | 382/173 |
| 2012/0140992 A1* | 6/2012 | Du | G06K 9/0061 |
| | | | 382/117 |
| 2016/0275348 A1 | 9/2016 | Slaby et al. | |

FOREIGN PATENT DOCUMENTS

| | | |
|---|---|---|
| TW | 201606553 | 2/2016 |
| TW | I553501 | 10/2016 |

OTHER PUBLICATIONS

Tieniu Tan, et al., "Noisy iris image matching by using multiple cues," Pattern Recognition Letters, vol. 33, Issue 8, Jun. 1, 2012, pp. 970-977.

Arif Iqbal Mozumder, et al., "An Efficient Approach towards Iris Recognition with Modular Neural Network Match Score Fusion," 2016 IEEE International Conference on Computational Intelligence and Computing Research (ICCIC), Dec. 15-17, 2016, pp. 1-6.

Esbern Andersen-Hoppe, et al., "Combining Multiple Iris Texture Features for Unconstrained Recognition in Visible Wavelengths," 2017 5th International Workshop on Biometrics and Forensics (IWBF), Apr. 4-5, 2017, pp. 1-6.

\* cited by examiner

ELECTRONIC DEVICE, IRIS RECOGNITION METHOD AND COMPUTER-READABLE MEDIUM

CROSS-REFERENCE TO RELATED APPLICATION

This application claims the priority benefit of Taiwan application serial no. 107111922, filed on Apr. 3, 2018. The entirety of the above-mentioned patent application is hereby incorporated by reference herein and made a part of this specification.

BACKGROUND OF THE DISCLOSURE

Field of the Disclosure

The disclosure relates to an iris recognition technique, and particularly relates to an electronic device capable of improving iris recognition accuracy, an iris recognition method and a computer-readable medium.

Description of Related Art

Current consumer electronic devices (such as tablet computers, smart phones, etc.) are expected to be enabled by specific users through a biological feature recognition technology (such as iris recognition, fingerprint identification, etc.), so as to protect data and privacy in the consumer electronic devices. In the iris recognition technique, it's very easy to influence the quality of an iris image extracted from a human eye because of environmental changes. For example, sunlight projection of different angles and intensities may lead to a change of a part of textures of the iris image, over-exposure of the iris image due to excessive outdoor light may cause texture disappearing, or a texture detail of the iris image is disappeared due to image over-contrast, etc., which may decrease recognition accuracy of the electronic device on the iris image.

Therefore, to effectively improve the accuracy of the iris recognition is an important issue for related technicians of the field.

SUMMARY OF THE DISCLOSURE

The disclosure is directed to an electronic device, an iris recognition method and a computer-readable medium, which are adapted to generate corresponding feature mark boxes according to iris images, and by comparing a predetermined iris image and a captured iris image in a bidirectional cross comparison manner, accuracy of iris recognition is effectively improved.

The disclosure provides an electronic device including a processor and an image capturing device. The processor obtains a first iris image, and calculates a plurality of first feature mark boxes that are non-uniformly arranged according to the first iris image, and uses the first feature mark boxes to obtain a first image feature from the first iris image. The image capturing device is configured to capture a second iris image. The processor obtains the second iris image through the image capturing device, and uses the first feature mark boxes to obtain a second image feature from the second iris image, and compares the first image feature and the second image feature to obtain a first recognition result. The processor calculates a plurality of second feature mark boxes that are non-uniformly arranged according to the second iris image, and uses the second feature mark boxes to obtain a third image feature from the second iris image. The processor uses the second feature mark boxes to obtain a fourth image feature from the first iris image, and compares the third image feature and the fourth image feature to obtain a second recognition result. Moreover, the processor determines a similarity degree of the first iris image and the second iris image according to the first recognition result and the second recognition result.

The disclosure provides an iris recognition method including: obtaining a first iris image, and calculating a plurality of first feature mark boxes that are non-uniformly arranged according to the first iris image, and using the first feature mark boxes to obtain a first image feature from the first iris image; obtaining a second iris image, and using the first feature mark boxes to obtain a second image feature from the second iris image, and comparing the first image feature and the second image feature to obtain a first recognition result; calculating a plurality of second feature mark boxes that are non-uniformly arranged according to the second iris image, using the second feature mark boxes to obtain a third image feature from the second iris image; using the second feature mark boxes to obtain a fourth image feature from the first iris image, and comparing the third image feature and the fourth image feature to obtain a second recognition result; and determining a similarity degree of the first iris image and the second iris image according to the first recognition result and the second recognition result.

The disclosure provides a non-volatile computer-readable medium used for storing a plurality of program codes, wherein the program codes are adapted to be loaded to a processor to execute the aforementioned iris recognition method.

According to the above description, the electronic device of the embodiment of the disclosure generates corresponding feature mark boxes by detecting whether a part of the image regions in the first iris image (for example, an iris image input during a registration phase) has a stronger texture feature, and uses the feature mark boxes to determine whether the first iris image is similar to the second iris image (for example, a captured iris image). Moreover, the electronic device generates corresponding feature mark boxes according to the second iris image, and uses the feature mark boxes to determine the similarity degree of the first iris image and the second iris image. In this way, the processor may compare the similarity degree of the first iris image and the second iris image in the bidirectional cross comparison manner, so as to effectively improve accuracy and a fault tolerance for iris recognition.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
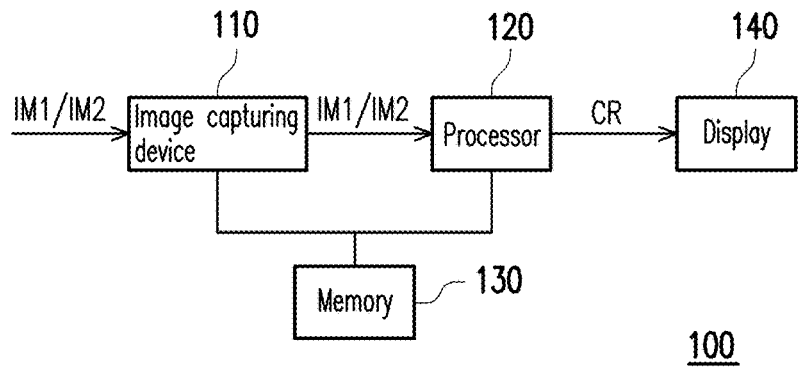
FIG. 1 is a block diagram of an electronic device according to an embodiment of the disclosure.

FIG. 1 is a block diagram of an electronic device 100 according to an embodiment of the disclosure. The electronic device 100 includes an image capturing device 110, a processor 120, a memory 130 and a display 140. In the embodiment, the processor 120 is coupled to the image capturing device 110 for obtaining a first iris image IM and a second iris image IM2. The first iris image IM1 obtained by the processor 120 may be the first iris image IM1 captured by the image capturing device 110 at a first time point, or image data (a picture or an image with eyes image of the user) pre-stored in the memory 130 by a user. The second iris image IM2 obtained by the processor 120 may be the second iris image IM2 captured by the image capturing device 110 at a second time point after the first time point. The processor 120 may further determine a similarity degree of the first iris image IM1 and the second iris image IM2 to provide a determination result CR.

The memory 130 is coupled to the image capturing device 110 and the processor 120, and is used for storing a plurality of first feature mark boxes and a plurality of second feature mark boxes. The display 140 is coupled to the processor 120, and receives the determination result CR to present the determination result CR on the display 140.

In the embodiment, the electronic device 100 may be a notebook computer, a tablet computer, a smart phone, a Personal Digital Assistant (PDA), though the disclosure is not limited thereto. The image capturing device 110 is, for example, an electronic device with an image capturing or photographing function such as a camera, an infrared or visible light video camera, etc., which is not limited by the disclosure. The user may use the image capturing device 110 to capture or photograph an eye image of himself or others, so as to obtain the iris image (for example, the first iris image IM1 or the second iris image IM2) in the eye image. On the other hand, the processor 120 may be a Central Processing Unit (CPU), or other programmable general purpose or special purpose microprocessor, a Digital Signal Processor (DSP), a programmable controller, an Application Specific Integrated Circuit (ASIC) or other similar devices or a combination of the above devices, though the disclosure is not limited thereto. The memory 130 is, for example, a Resistive Random-Access Memory (RRAM), a Ferroelectric RAM (FeRAM), a Magnetoresistive RAM (MRAM), a Phase changeRAM (PRAM), a Conductive bridge RAM (CBRAM), though the disclosure is not limited thereto. The display 140 is, for example, a device with a display function such as a Liquid-Crystal Display (LCD) or an Organic Light-Emitting Diode (OLED), etc.

In the embodiment, the first iris image IM1 and the second iris image IM2 are, for example, respectively an iris image (for example, a registered iris image) input by the user during a registration phase (i.e. the first time point) and an iris image (for example, a test iris image) captured by the image capturing device 110 at the second time point. The first iris image IM1 and the second iris image IM2 may be respectively a grayscale image or a color image, though the disclosure is not limited thereto. The aforementioned registration phase is, for example, a phase when the user captures or photographs the eye image of himself or others at the first time point in advance before the user activates or unlocks the electronic device 100, or a phase when the user stores the eye image of himself or others to the memory 130 at the first time point in advance, such that the processor 120 may obtain the iris image (for example, the first iris image IM1) in the eye image through the image capturing device 110 or the memory 130 to serve as a reference sample for subsequently activating or unlocking the electronic device 100.

Figure 2:
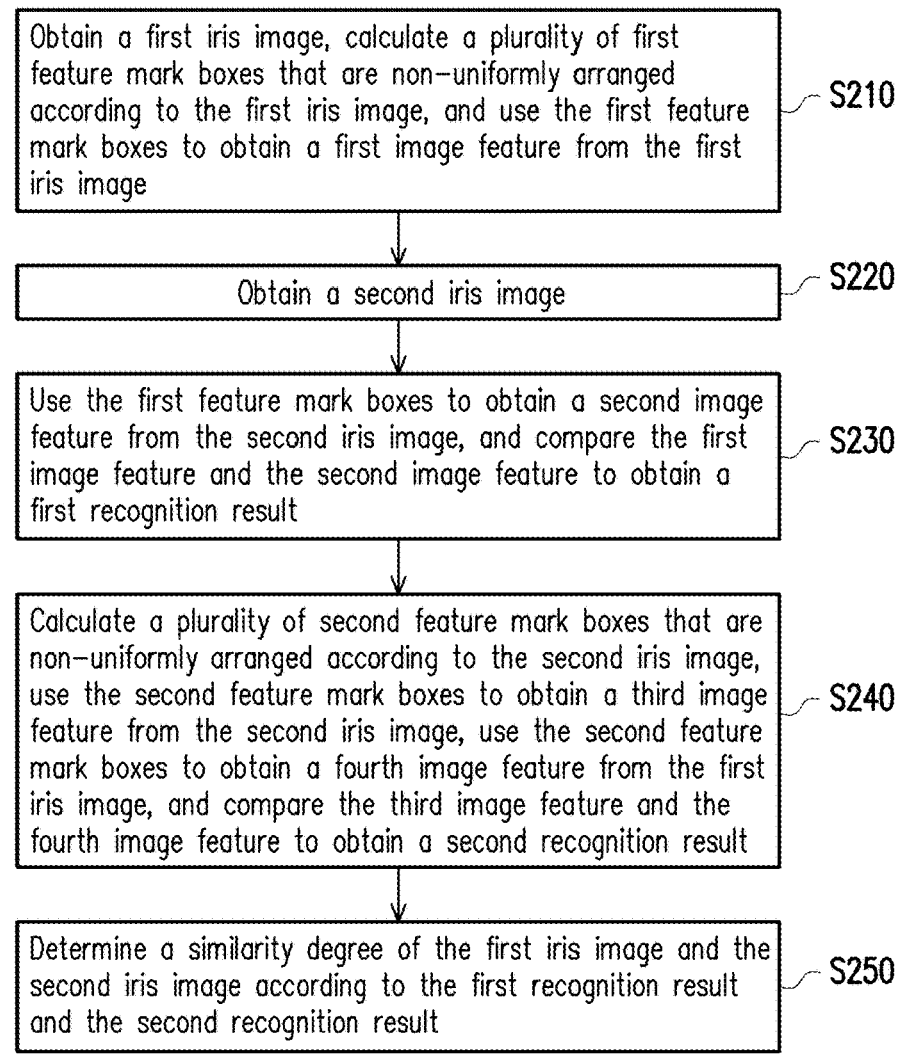
FIG. 2 is a flowchart illustrating an iris recognition method according to an embodiment of the disclosure.
Figure 3:
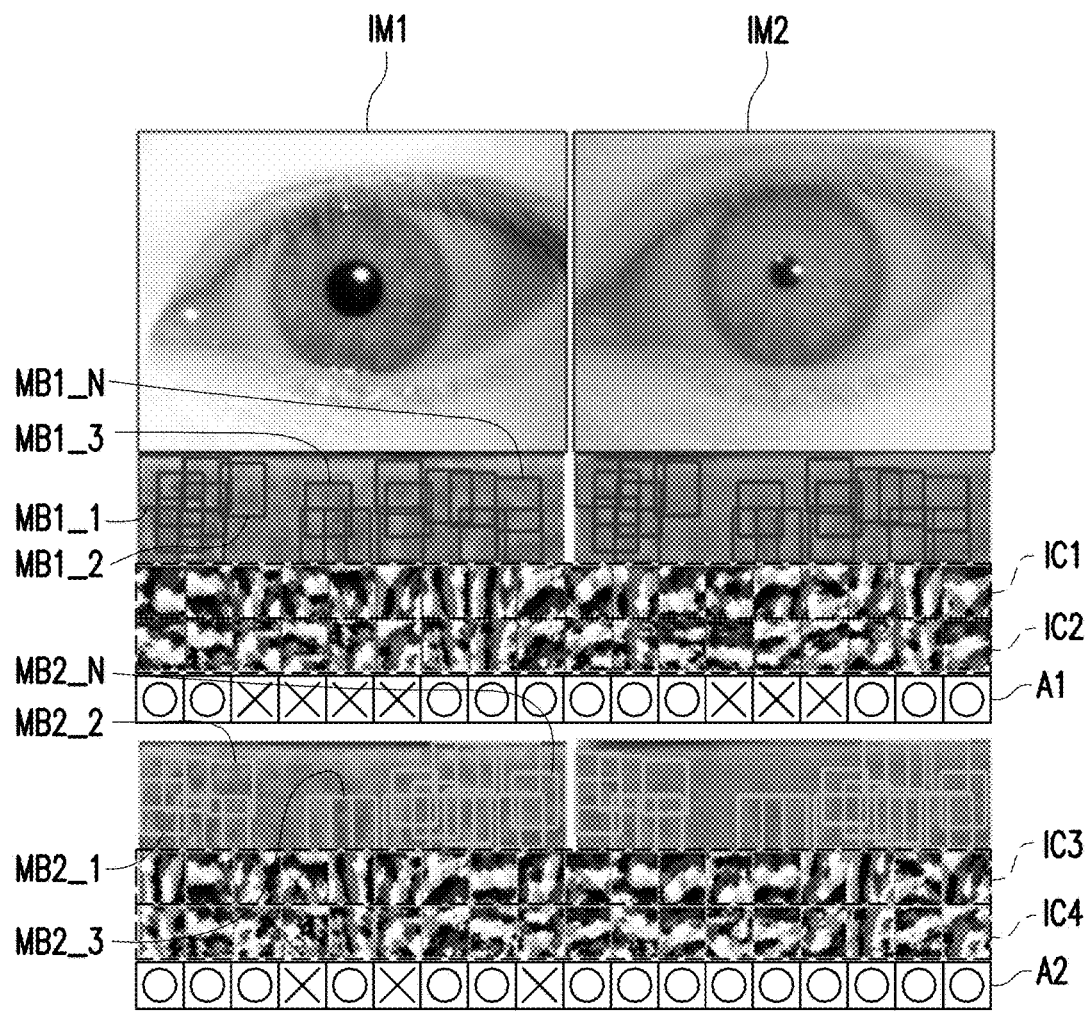
FIG. 3 is a schematic diagram of a bidirectional cross comparison method of a first iris image and a second iris image according to an embodiment of the disclosure.
Figure 4:
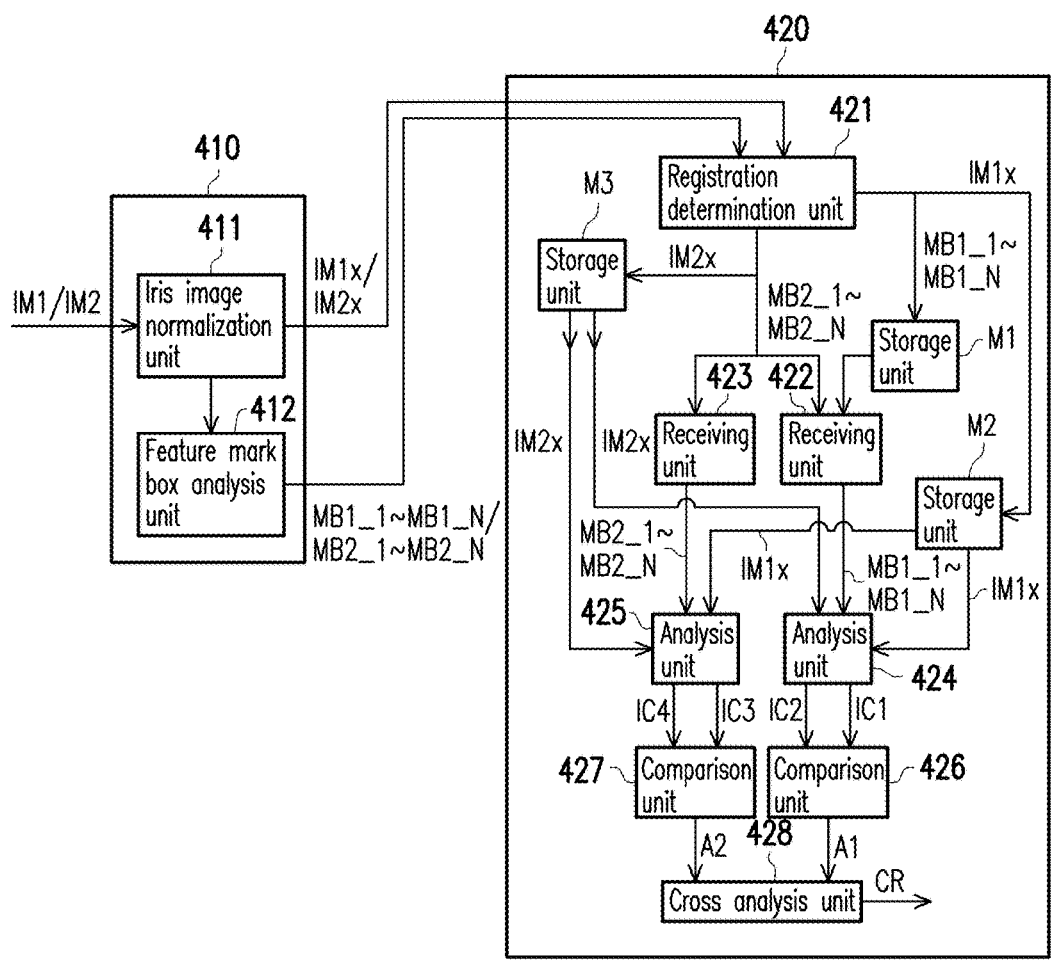
FIG. 4 is a schematic diagram of a feature location unit and a cross comparison unit according to an embodiment of the disclosure.

Referring to FIG. 1, FIG. 2 and FIG. 3, FIG. 2 is a flowchart illustrating an iris recognition method according to an embodiment of the disclosure, and FIG. 3 is a schematic diagram of a bidirectional cross comparison method of the first iris image and the second iris image according to an embodiment of the disclosure. In step S210, the processor 120 obtains the first iris image IM1 through the image capturing device 110 or from the eye image pre-stored in the memory 130. The processor 120 may calculate a plurality of first feature mark boxes MB1_1-MB1_N that are non-uniformly arranged according to the first iris image IM1. Then, the processor 120 may use the first feature mark boxes MB1_1-MB1_N to obtain a first image feature IC1 from the first iris image IM1.

In detail, in the embodiment, the processor 120 may sequentially detect a plurality of image regions in the first iris image IM1 to determine whether each of the image regions has a stronger texture feature. For example, when the processor 120 determines that a feature value of a detected image region in the first iris image IM1 is greater than a threshold, it represents that the image region has the stronger texture feature, and the processor 120 calculates the feature mark box of the image region according to the feature value of the image region, and continually detects a next image region. Comparatively, when the processor 120 determines that the feature value of the detected image region in the first iris image IM1 is smaller than the threshold, it represents that the image region does not have the stronger texture feature, and the processor 120 neglects the feature value of the image region, and continually detects the next image region. In this way, in the first iris image IM1, the processor 120 may calculate the first feature mark boxes MB1_1-MB1_N that are non-uniformly arranged according to the image regions with the feature values greater than the threshold. The processor 120 may use the first feature mark boxes MB1_1-MB1_N to obtain the first image feature IC1 from the first iris image IM1.

In step S220, the user, for example, uses the image capturing device 110 to capture the second iris image IM2 (for example, the eye image of the user) in the sunlight or an outdoor environment, though the disclosure is not limited thereto.

In step S230, the processor 120 obtains the second iris image IM2 (for example, the eye image of the user captured in the sunlight or the outdoor environment) through the image capturing device 110. It should be noted that in the embodiment, the processor 120 may use the first feature mark boxes MB1_1-MB1_N to obtain a second image feature IC2 from the second iris image IM2. The processor 120 may compare the first image feature IC1 and the second image feature IC2 to obtain a first recognition result A1. In FIG. 3, the first image feature IC1 has 18 iris image features obtained from the first iris image IM1, and the second image feature IC2 has 18 iris image features obtained from the second iris image IM2.

To be specific, the processor 120 may sequentially compare similar partial features of the 18 iris image features in the first iris image feature IC1 and the 18 iris image features in the second iris image feature IC2 to determine a similarity degree of each two corresponding iris image features in the first image feature IC1 and the second image feature IC2. The processor 120 may obtain the first recognition result A1 according to the similarity degree of each two corresponding iris image features. In the first recognition result A1, a symbol O represents that the iris image feature in the first image feature IC of the straight column is substantially similar to the iris image feature in the second image feature IC2 of the same straight column, and a symbol X represents that the iris image feature in the first image feature IC of the straight column is substantially not similar to the iris image feature in the second image feature IC2 of the same straight column.

In step S240, the processor 120 calculates a plurality of second feature mark boxes MB2_1-MB2_N that are non-uniformly arranged according to the second iris image IM2. Then, the processor 120 uses the second feature mark boxes MB2_1-MB2_N to obtain a third image feature IC3 from the second iris image IM2.

In detail, in the embodiment, the processor 120 may sequentially detect a plurality of image regions in the second iris image IM2 to determine whether each of the image regions has a stronger texture feature. For example, when the processor 120 determines that a feature value of a detected image region in the second iris image IM2 is greater than a threshold, it represents that the image region has the stronger texture feature, and the processor 120 calculates the feature mark box of the image region according to the feature value of the image region, and continually detects a next image region. Comparatively, when the processor 120 determines that the feature value of the detected image region in the second iris image IM2 is smaller than the threshold, it represents that the image region does not have the stronger texture feature, and the processor 120 neglects the feature value of the image region, and continually detects the next image region. In this way, in the second iris image IM2, the processor 120 may calculate the second feature mark boxes MB2_1-MB2_N that are non-uniformly arranged according to the image regions with the feature values greater than the threshold. The processor 120 may use the second feature mark boxes MB2_1-MB2_N to obtain the third image feature IC3 from the second iris image IM2.

In the embodiment, the processor 120 uses the second feature mark boxes MB2_1-MB2_N to obtain a fourth image feature IC4 from the first iris image IM1. The processor 120 may compare the third image feature IC3 and the fourth image feature IC4 to obtain a second recognition result A2. In FIG. 3, the third image feature IC3 has 18 iris image features obtained from the second iris image IM2, and the fourth image feature IC4 has 18 iris image features obtained from the first iris image IM1.

To be specific, the processor 120 may sequentially compare similar partial features of the 18 iris image features in the third iris image feature IC3 and the 18 iris image features in the fourth iris image feature IC4 to determine a similarity degree of each two corresponding iris image features in the third image feature IC3 and the fourth image feature IC4. The processor 120 may obtain the second recognition result A2 according to the similarity degree of each two corresponding iris image features. In the second recognition result A2, the symbol O represents that the iris image feature in the third image feature IC3 of the straight column is substantially similar to the iris image feature in the fourth image feature IC4 of the same straight column, and the symbol X represents that the iris image feature in the third image feature IC3 of the straight column is substantially not similar to the iris image feature in the fourth image feature IC4 of the same straight column.

In step S250, the processor 120 determines a similarity degree of the first iris image IM1 and the second iris image IM2 according to the first recognition result A1 and the second recognition result A2. The processor 120 may average the similarity degrees respectively calculated according to the first recognition result A1 and the second recognition result A2 to obtain a calculation result of the bidirectional cross comparison. For example, if the calculation result of the bidirectional cross comparison is a value close to 1, it represents that the image features of the first iris image IM1 and the second iris image IM2 are substantially similar. Comparatively, if the calculation result of the bidirectional cross comparison is a value close to 0, it represents that the image features of the first iris image IM1 and the second iris image IM2 are substantially not similar.

In the embodiment, the aforementioned non-uniform arrangement refers to that the processor 120 calculates the first feature mark boxes MB1_1-MB1_N and the second feature mark boxes MB2_1-MB2_N only according to the image regions with the feature values greater than the threshold (i.e. the image regions with a high texture feature) in the first iris image IM1 and the second iris image IM2, and neglects the image regions with the feature values smaller than the threshold (i.e. the image regions without the high texture feature). Compared to the conventional technique that the image region in the iris image is averagely divided into a predetermined number of parts to directly calculate the feature mark boxes of the iris image, by using the first feature mark boxes MB1_1-MB1_N and the second feature mark boxes MB2_1-MB2_N that are non-uniformly arranged of the embodiment, the subsequent bidirectional cross comparison method may improve the accuracy and fault tolerance of the iris recognition.

Referring to FIG. 1 to FIG. 4, FIG. 4 is a schematic diagram of a feature location unit and a cross comparison unit according to an embodiment of the disclosure. In the embodiment, the processor 120 further includes a feature location unit 410 and a cross comparison unit 420. The feature location unit 410 is coupled to the cross comparison unit 420. The feature location unit 410 includes an iris image normalization unit 411 and a feature mark box analysis unit 412. The cross comparison unit 420 includes a registration determination unit 421, receiving units 422, 423, analysis units 424, 425, comparison units 426, 427, a cross analysis unit 428, storage units M1-M3. The feature location unit 410 and the cross comparison unit 420 may be implemented by software or firmware modules, which is not limited by the disclosure.

In the embodiment, the feature location unit 410 may receive the first iris image IM1 and the second iris image IM2. The feature location unit 410 may use the iris image normalization unit 411 to perform normalization and comparison feature calculation to the first iris image IM1 and the second iris image IM2.

Further, the iris image normalization unit 411 of the embodiment may obtain iris region division information in the first iris image IM1 and the second iris image IM2 through an Integrodifferential Operator or Hough Transform method, and transform the iris region division information to polar coordinates through a Rubber Sheet Model, so as to obtain the normalized first iris image IM1$x$ and second iris image IM2$x$ to further eliminate an influence of a pupil on the iris recognition.

The iris image normalization unit 411 may further process the first iris image IM1$x$ and the second iris image IM2$x$ by using a transform method such as Gabor Wavelet, Local Binary Pattern or Histogram of Oriented Gradient, etc., to obtain obvious or prominent image features in the first iris image IM1$x$ and the second iris image IM2$x$ (for example, a border or detail texture of the first iris image IM1 and the second iris image IM2).

In the embodiment, the feature mark box analysis unit 412 is coupled to the iris image normalization unit 411 to receive the normalized first iris image IM1$x$ and second iris image IM2$x$. The feature mark box analysis unit 412 may respectively process the first iris image IM1$x$ and the second iris image IM2$x$ through boundary enhancement or texture quantization to obtain a plurality of the first feature mark boxes MB1_1-MB1_N and a plurality of the second feature mark boxes MB2_1-MB2_N.

The feature mark box analysis unit 412 may obtain texture strength quantization data of the first iris image IM1$x$ and the second iris image IM2$x$ through a texture quantization processing method such as Sobel Operator, Laplacian Of Gaussian or Texture Energy Measurement, etc. Moreover, the feature mark box analysis unit 412 may obtain a plurality of the first feature mark boxes MB1_1-MB1_N and a plurality of the second feature mark boxes MB2_1-MB2_N according to the texture strength quantization data.

On the other hand, the cross comparison unit 420 may determine whether the electronic device 100 is operated in the registration phase by using the registration determination unit 421. When the registration determination unit 421 determines that the electronic device 100 is operated in the registration phase, the iris image normalization unit 411 may store the first iris image IM1$x$ to the storage unit M2, and the feature mark box analysis unit 412 may store the first feature mark boxes MB1_1-MB1_N to the storage unit M1.

Comparatively, when the registration determination unit 421 determines that the electronic device 100 is not operated in the registration phase, the iris image normalization unit 411 may store the second iris image IM2$x$ to the storage unit M3. Meanwhile, the receiving unit 422 may receive the first feature mark boxes MB1_1-MB1_N stored in the storage unit M1, and the receiving unit 423 may receive the second feature mark boxes MB2_1-MB2_N provided by the feature mark box analysis unit 412.

In the embodiment, the analysis unit 424 may receive the first feature mark boxes MB1_1-MB1_N, the first iris image IM1$x$ and the second iris image IM2$x$. It should be noted that the analysis unit 424 may obtain the first image feature IC1 from the first iris image IM1$x$ by using the first feature mark boxes MB1_1-MB1_N. The analysis unit 424 may also obtain the second image feature IC2 from the second iris image IM2$x$ by using the first feature mark boxes MB1_1-MB1_N.

Comparatively, in the embodiment, the analysis unit 425 may receive the second feature mark boxes MB2_1-MB2_N, the first iris image IM1$x$ and the second iris image IM2$x$. It should be noted that the analysis unit 425 may obtain the third image feature IC3 from the second iris image IM2$x$ by using the second feature mark boxes MB2_1-MB2_N. The analysis unit 425 may also obtain the fourth image feature IC4 from the first iris image IM1$x$ by using the second feature mark boxes MB2_1-MB2_N.

In the embodiment, the comparison unit 426 may receive the first image feature IC1 and the second image feature IC2, and compares the first image feature IC1 and the second image feature IC2 to obtain the first recognition result A1. On the other hand, the comparison unit 427 may receive the third image feature IC3 and the fourth image feature IC4, and compares the third image feature IC3 and the fourth image feature IC4 to obtain the second recognition result A2.

The cross analysis unit 428 may receive the first recognition result A1 and the second recognition result A2, and the cross analysis unit 428 may determine a similarity degree of the first iris image IM1 and the second iris image IM2 to provide the determination result CR according to the first recognition result A1 and the second recognition result A2. It should be noted that in FIG. 4, the operation methods and comparison methods of each of the units in the feature location unit 410 and the cross comparison unit 420 are all the same to or similar to the steps S210-S250 of FIG. 2, and details thereof are not repeated.

Figure 5:
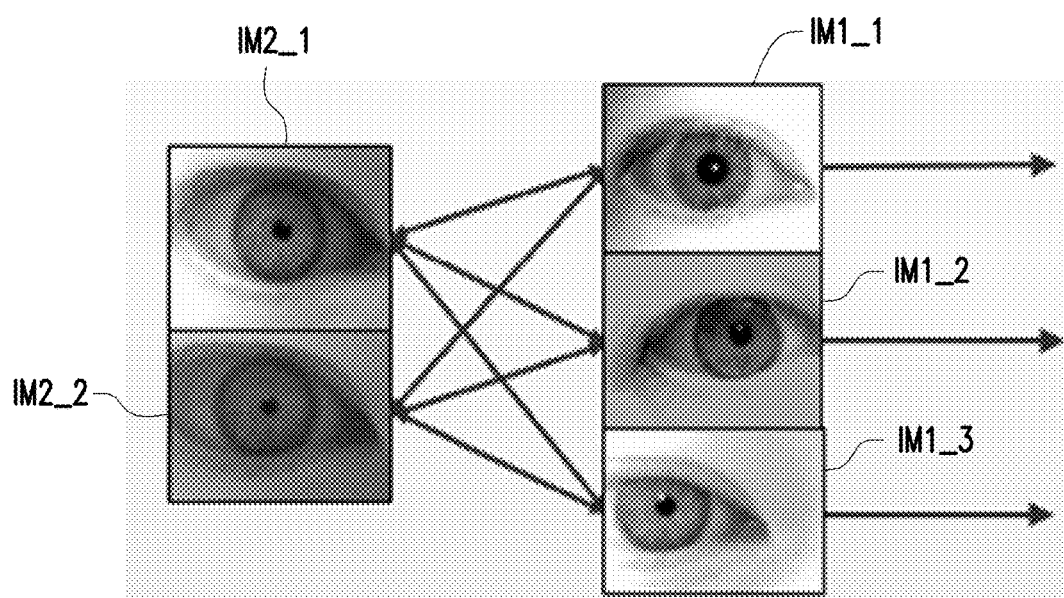
FIG. 5 is a schematic diagram of a bidirectional cross comparison method of a plurality of first iris images and second iris images according to another embodiment of the disclosure.

FIG. 5 is a schematic diagram of the bidirectional cross comparison method of a plurality of first iris images and second iris images according to another embodiment of the disclosure. In the embodiment, the user determines the number of the first iris image IM1 and the second iris image IM2 captured by the image capturing device 110 according to an actual requirement or a usage condition. In detail, in the embodiment, the processor 120 may obtain a plurality of first iris images IM1_1-IM1_3 at a first time point through the image capturing device 110 or from the eye images pre-stored in the memory 130 by the user. Comparatively, the processor 120 may obtain a plurality of second iris images IM2_1-IM2_2 at a second time point through the image capturing device 110. Then, the similarity degrees of the first iris images IM1_1-IM1_3 and the second iris images IM2_1-IM2_2 may be compared based on the bidirectional cross comparison method of the aforementioned embodiment. However, the disclosure is not limited to the above exampled number.

Figure 6:
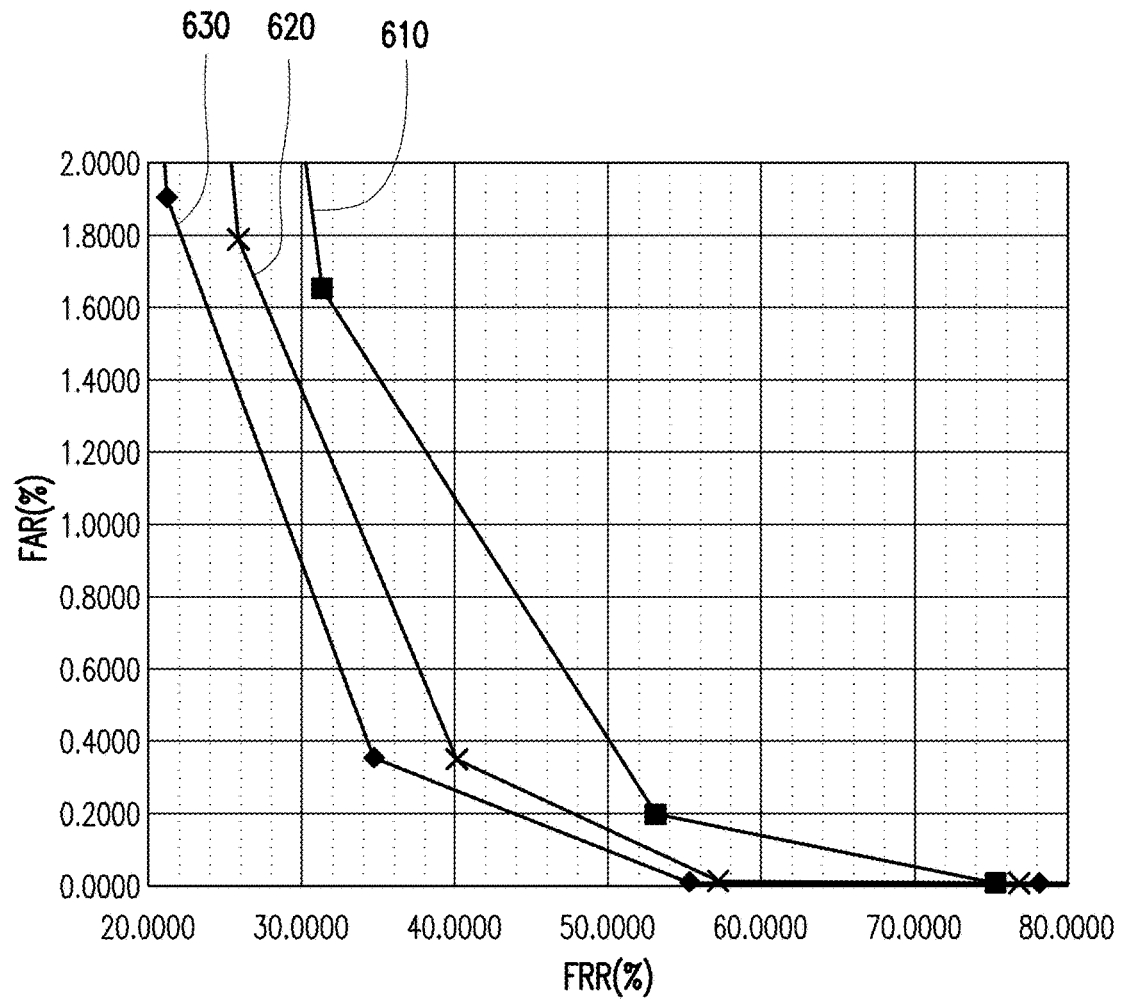
FIG. 6 is a curve diagram of a false rejection rate-a false acceptance rate of an electronic device according to an embodiment of the disclosure.

FIG. 6 is a curve diagram of a false rejection rate-a false acceptance rate of an electronic device according to an embodiment of the disclosure. In FIG. 6, a horizontal axis represents a False Rejection Rate (FRR) of the electronic device 100, and a vertical axis represents a False Acceptance Rate (FAR) of the electronic device 100. The curve diagram of FRR-FAR of the electronic device 100 includes a curve 610 that implements the iris recognition only through a uniform comparison method, a curve 620 that implements the iris recognition only through a comparison method of detecting stronger texture features of the registered iris image, and a curve 630 that implements the iris recognition through the iris recognition method of the disclosure. In the embodiment, the electronic device 100 uses the processor 120 to detect whether a part of image regions of the first iris image IM1 (for example, the iris image input during the registration phase) has stronger texture features to generate corresponding feature mark boxes, and uses the feature mark boxes to determine whether the first iris image IM1 and the second iris image IM2 (for example, the captured iris image) are similar to each other. Moreover, in the embodiment, corresponding feature mark boxes may also be generated according to the second iris image IM2, and the similarity degree of the first iris image IM1 and the second iris image IM2 may be determined according to the above feature mark boxes. In this way, during a test time interval, the iris recognition method of the embodiment may determine the similarity degree of the first iris image IM1 and the second iris image IM2 through the bidirectional cross comparison, and the curve 630 has lower FRR and FAR compared to the curve 610 and the curve 620.

In the embodiment, the user may execute the aforementioned iris recognition method through a non-volatile computer-readable medium, and the non-volatile computer-readable medium may be used for storing a plurality of program codes (for example, program codes used for executing the aforementioned related functions, though the disclosure is not limited thereto), and the program codes may be loaded to the processor, and the processor executes the aforementioned related functions. It should be noted that the non-volatile computer-readable medium is, for example, a compact disk, a Universal Serial Bus (USB) and any memory device having the non-volatile characteristic, though the disclosure is not limited thereto.

In summary, the electronic device of the embodiment of the disclosure uses the processor to detect whether a part of image regions of the first iris image (for example, the iris image input during the registration phase) has stronger texture features to generate corresponding feature mark boxes, and uses the feature mark boxes to determine whether the first iris image and the second iris image (for example, the captured iris image) are similar to each other. Moreover, corresponding feature mark boxes may also be generated according to the second iris image, and the similarity degree of the first iris image and the second iris image may be determined according to the above feature mark boxes. In this way, the processor may compare the similarity degree of the first iris image and the second iris image in the bidirectional cross comparison manner, so as effectively improve accuracy and a fault tolerance for iris recognition.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
   a processor, obtaining a first iris image, calculating a plurality of first feature mark boxes that are non-uniformly arranged according to the first iris image, and using the first feature mark boxes to obtain a first image feature from the first iris image; and
   an image capturing device, configured to capture a second iris image,
   wherein the processor obtains the second iris image through the image capturing device, and uses the first feature mark boxes to obtain a second image feature from the second iris image, and compares the first image feature and the second image feature to obtain a first recognition result,
   the processor calculates a plurality of second feature mark boxes that are non-uniformly arranged according to the second iris image, and uses the second feature mark boxes to obtain a third image feature from the second iris image, and the processor uses the second feature mark boxes to obtain a fourth image feature from the first iris image, and compares the third image feature and the fourth image feature to obtain a second recognition result, and
   the processor determines a similarity degree of the first iris image and the second iris image according to the first recognition result and the second recognition result.

2. The electronic device as claimed in claim 1, wherein the image capturing device captures the first iris image at a first time point and captures the second iris image at a second time point after the first time point, and respectively provides the first iris image and the second iris image to the processor.

3. The electronic device as claimed in claim 1, wherein the processor sequentially detects a plurality of image regions in the first iris image and the second iris image, wherein
   when a feature value of a detected image region in the first iris image is greater than a threshold, the processor calculates a first feature mark box of an image region according to the feature value of the detected image region; and
   when a feature value of a detected image region in the second iris image is greater than the threshold, the processor calculates a second feature mark box of the image region according to the feature value of the detected image region in the second iris image.

4. The electronic device as claimed in claim 1, further comprising:
   a memory, coupled to the image capturing device and the processor, and configured to store the first feature mark boxes and the second feature mark boxes.

5. The electronic device as claimed in claim 1, further comprising:
   a display, coupled to the processor, and configured to present a determination result of the similarity degree of the first iris image and the second iris image.

6. The electronic device as claimed in claim 1, wherein the first iris image and the second iris image are grayscale images or color images.

7. An iris recognition method, comprising:
   obtaining a first iris image, calculating a plurality of first feature mark boxes that are non-uniformly arranged according to the first iris image, and using the first feature mark boxes to obtain a first image feature from the first iris image;
   obtaining a second iris image;
   using the first feature mark boxes to obtain a second image feature from the second iris image, and comparing the first image feature and the second image feature to obtain a first recognition result;
   calculating a plurality of second feature mark boxes that are non-uniformly arranged according to the second iris image, using the second feature mark boxes to obtain a third image feature from the second iris image, using the second feature mark boxes to obtain a fourth image feature from the first iris image, and comparing the third image feature and the fourth image feature to obtain a second recognition result; and
   determining a similarity degree of the first iris image and the second iris image according to the first recognition result and the second recognition result.

8. The iris recognition method as claimed in claim 7, wherein the first iris image is captured at a first time point and the second iris image is captured at a second time point after the first time point, so as to respectively provide the first iris image and the second iris image.

9. The iris recognition method as claimed in claim 7, wherein the step of calculating the first feature mark boxes that are non-uniformly arranged according to the first iris image comprises:
   sequentially detecting a plurality of image regions in the first iris image and the second iris image;

when a feature value of a detected image region in the first iris image is greater than a threshold, calculating a first feature mark box of a image region according to the feature value of the detected image region; and when a feature value of a detected image region in the second iris image is greater than the threshold, calculating a second feature mark box of the image region according to the feature value of the detected image region in the second iris image.

10. The iris recognition method as claimed in claim 7, further comprising:

storing the first feature mark boxes and the second feature mark boxes.

11. The iris recognition method as claimed in claim 7, further comprising:

presenting a determination result of the similarity degree of the first iris image and the second iris image.

12. The iris recognition method as claimed in claim 7, wherein the first iris image and the second iris image are grayscale images or color images.

13. A non-transitory computer-readable medium, configured to store a plurality of program codes, wherein the program codes are adapted to be loaded to a processor to execute the iris recognition method as claimed in claim 7.

* * * * *